US007081505B2

(12) United States Patent
Sommazzi et al.

(10) Patent No.: US 7,081,505 B2
(45) Date of Patent: Jul. 25, 2006

(54) ACTIVATING ORGANOMETALLIC COMPOSITION FOR THE (CO) POLYMERIZATION OF ALPHA-OLEFINS COMPRISING FLUORINATED CYCLOPENTADIENYL COMPOUNDS

(75) Inventors: Anna Sommazzi, Genoa (IT); Francesco Masi, Sant'Angelo Lodigiano-Lodi (IT); Giampietro Borsotti, Novara (IT); Roberto Santi, Novara (IT); Fausto Calderazzo, Ghezzano-Pisa (IT); Guido Pampaloni, Pontedera-Pisa (IT); Vincenzo Passarelli, Pisa (IT)

(73) Assignee: Polimeri Europa S.p.A., Brindisi (IT)

( * ) Notice: Subject to any disclaimer, the term of this patent is extended or adjusted under 35 U.S.C. 154(b) by 0 days.

(21) Appl. No.: 10/483,415

(22) PCT Filed: Jul. 10, 2002

(86) PCT No.: PCT/EP02/07684

§ 371 (c)(1),
(2), (4) Date: May 7, 2004

(87) PCT Pub. No.: WO03/010210

PCT Pub. Date: Feb. 6, 2003

(65) Prior Publication Data

US 2004/0198934 A1    Oct. 7, 2004

(30) Foreign Application Priority Data

Jul. 20, 2001    (IT) ........................ M12001A1554

(51) Int. Cl.
*C08F 4/44*      (2006.01)
*C08F 4/6192*    (2006.01)

*B01J 31/14*     (2006.01)

(52) U.S. Cl. .................... 526/144; 526/141; 526/143; 526/160; 526/170; 526/943; 502/126; 502/124; 502/128; 502/152

(58) Field of Classification Search ............... 502/128, 502/126, 152, 124; 526/141, 143, 144, 170, 526/943, 160
See application file for complete search history.

(56) References Cited

U.S. PATENT DOCUMENTS 6,274,529 B1 * 8/2001 Fusco et al. ............... 502/126
6,596,891 B1   7/2003 Sommazzi et al. ........ 556/181

FOREIGN PATENT DOCUMENTS

EP    0 924 223    6/1999
EP    1 013 675    6/2000

* cited by examiner

*Primary Examiner*—Caixia Lu
(74) *Attorney, Agent, or Firm*—Oblon, Spivak, McClelland, Maier & Neustadt, P.C.

(57) ABSTRACT

An organometallic composition which can be used as activating component in a metallocene catalyst for the (co) polymerization of α-olefins, comprises: (A) a fluorinated di-unsaturated cyclic compound, having a relatively acid hydrogen atom, (B) an organometallic compound sufficiently basic to react with the acid hydrogen of the above compound (A), and (C) a polar aprotic organic compound, not containing metallic atoms, having a dielectric constant, in the pure state, equal to or greater than 2, and a weak coordinating capacity. Said composition allows a metallocene catalytic system of the ionic type to be obtained, with a high activity in the (co)polymerization of olefins and a reduced content of metallic residue in the polymeric product thus obtained.

35 Claims, No Drawings

ACTIVATING ORGANOMETALLIC COMPOSITION FOR THE (CO) POLYMERIZATION OF ALPHA-OLEFINS COMPRISING FLUORINATED CYCLOPENTADIENYL COMPOUNDS

The present invention relates to an activating organometallic composition for the (co)polymerization of α-olefins comprising at least one fluorinated cyclopentadienyl compound.

More specifically, the present invention relates to an activating composition of a metallocene complex to form a catalyst with a high activity for the polymerization of α-olefins, without boron and with a low content of other metals, particularly aluminum. The present invention also relates to said catalyst and a polymerization process of α-olefins using it.

It is generally known in the art that ethylene, or α-olefins in general, can be polymerized or copolymerized by means of low, medium or high pressure processes with catalysts based on a transition metal. A particular group of catalysts active in the polymerization of olefins consists of the combination of an organic oxyderivative of aluminum (in particular polymeric methylaluminoxane or MAO) with an $\eta^5$-cyclopentadienyl derivative (metallocene) of a transition metal of group 4 of the periodic table of elements (in the form approved by IUPAC and published by "CRC Press Inc." in 1989). For a known preparation technique of the above compounds, reference should be made to the description of H. Sinn, W. Kaminsky, in Adv. Organomet. Chem., vol. 18 (1980), page 99 and U.S. Pat. No. 4,542,199.

In spite of the numerous advantages with respect to the prior known art, represented by the traditional heterogeneous, or so-called Ziegler-Natta, catalysts of a multi-centric nature, catalysts based on metallocenes have also proved to have various disadvantages which have limited their industrial development. Among these, the production of polymers still with an insufficient average molecular weight, especially with high temperature polymerization processes, an unsatisfactory activation rapidity of the catalytic system in processes characterized by reduced residence times in the reactor, the use of high quantities of MAO activator and the difficulty of preparing and conserving the latter on an industrial scale, can be mentioned.

In an attempt to overcome problems particularly relating to the use of MAO, catalysts of the metallocene type have been recently developed, which are capable of polymerizing olefins also without aluminum compounds, or in the presence of a more limited quantity of this metal. These systems are commonly based on the formation of a catalytic species of a cationic nature, obtained by the contact of a suitable metallocene with an activator consisting of a strong Lewis acid or, more advantageously, an organometallic salt whose anion has a delocalized charge and is weakly co-ordinating, usually a tetrakis-(fluoroaryl)borane. Various cationic systems of this type are described for example, in the publications of R. R. Jordan in "Advances of Organometallic Chemistry", vol. 32 (1990), pages 325-387, and X. Yang et al. in "Journal of the American Chemical Society", vol. 116 (1994), page 10015, which, together with a detailed description of the field, provide numerous patent references on the subject.

The activity of cationic metallocene catalytic systems however, is generally lower than the significant activity of systems using methylalumoxane.

Furthermore, the known methods for the preparation of the above ionic activators based on fluoroarylboranes are complex, with not entirely satisfactory yields, further limiting the industrial use of cationic catalysts. Another disadvantage is represented by the sensitivity of these ionic activators to air and humidity which makes their transfer and storage problematical.

A further unsatisfactory aspect of the above catalysts, both ionic and also based on MAO, relates to their behaviour in the copolymerization of ethylene with other α-olefins and/or suitable dienes, to produce linear low density polyethylene or olefinic elastomers, again linked to the difficulty of obtaining copolymers with sufficiently high molecular weights, suitable for the numerous applications in the field. The necessity of operating with considerable quantities of comonomer to insert the desired quantity into the copolymer, with a consequent increase in the chain transfer reaction rate, competitive with the polymerization, and the production of unsatisfactory molecular weights, is in fact known. This drawback becomes even more critical when operating with high temperature polymerization processes in which the chain transfer reaction is already high without the comonomer.

Other cationic systems based on metallocenes and fluoroaryl aluminates are described in international patent application WO 98/0715, which claims a greater catalytic activity. These catalysts however are relatively complex to prepare and are particularly unstable to air and humidity, analogously to those containing boron-anions, and in addition they are not easily adaptable to non-alkylated metallocene complexes.

European patent application EP-A 1013675, in the name of the Applicant, recently describes particular activating compositions of metallocene complexes, suitable for forming catalysts with a high activity for the (co)polymerization of α-olefins, which at least partially overcome the above disadvantages. These activating compounds are based on widely fluorinated compounds comprising a di-unsaturated cyclic structure having five or six carbon atoms in the cycle, combined with certain metal-alkyls of the second or third group of the periodic table. The polyolefins obtained with said catalysts have, among other things, the advantage of containing much lower quantities of aluminum with respect to the corresponding metallocene catalysts based on traditional activators.

In spite of the technical progress made, some aspects of these catalytic compositions are still not completely satisfactory, with particular reference to their stability over a period of time, and to the activity and preparation of the catalysts deriving therefrom.

In particular, it would be extremely useful to be able to conserve significant quantities of activating compositions for relatively long periods of time, in order to enable their storage and transportation, whereas at the moment they must be prepared at the moment of use.

Stabilization techniques are also known, of organometallic compounds and complexes of an ionic nature (i.e. in which the compound or complex is significantly dissociated in ions, in solution or also in the solid state, such as the above activating compounds, for example), by means of coordinating compounds such as ethers, amines, phosphines, etc., which however, in this case, cannot be used for the purpose as they normally have a deactivating function of the metallocene in the polymerization catalysis of olefins.

In the continuous efforts made for research and improvement in this field, the Applicant has now found that with certain expedients, it is possible to obtain stable salts or ionic compositions of fluorinated cyclopentadienyl compounds, which, among other things, have a greater flexibility of use in the preparation of the corresponding catalytic compositions comprising a metallocene complex.

A first object of the present invention therefore relates to an organometallic composition which can be used as activating component of a metallocene catalyst in the (co)polymerization of α-olefins, characterized in that it comprises the following three components in contact with each other:

(A) a fluorinated organic compound, comprising at least one di-unsaturated cycle with 5 or 6 carbon atoms, having the following formula (I):

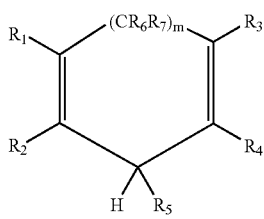

(I)

wherein: H is a weakly acid hydrogen atom, each $R_i$ group (with i an integer from 1 to 7) is a substituent of the di-unsaturated cycle independently selected from hydrogen, fluorine and an aliphatic or aromatic, fluorinated or non-fluorinated hydrocarbyl group, having from 1 to 20 carbon atoms, optionally joined to a different $R_i$ hydrocarbyl group to form a further cycle, with the proviso that at least two, preferably at least three, of the groups $R_1$, $R_2$, $R_3$, $R_4$ or $R_5$ are independently selected from the group consisting of:

fluorine, or a fluorinated alkyl group having the formula —CF($R_9R_{10}$), wherein each $R_9$ or $R_{10}$ group can have any of the above meanings of the $R_i$ groups and at least one of them is fluorine, or fluorinated alkyl at least in position 1, or a fluorinated aryl $Ar_F$ as defined below, or a fluorinated vinyl group $V_F$ as defined below, or a fluorinated aryl group $Ar_F$ substituted on the aromatic ring with at least two groups selected from fluorine, a —CF($R_9R_{10}$) group as defined above or a different ArF group, or a fluorinated vinyl group VF substituted on at least two positions of the double bond with groups selected from fluorine, a —CF($R_9R_{10}$) group or an ArF group as defined above; and "m" can have the values of 0 or 1;

(B) an organometallic compound sufficiently basic to react with the acid hydrogen of the above compound having formula (I) in an acid/base reaction;

(C) a polar aprotic organic compound, not containing metallic atoms, having a dielectric constant, in the pure state, equal to or greater than 2, and a weak coordinating capacity corresponding to a donicity DN, as defined below, not greater than 15 kcal/moles, and preferably ranging from 1.0 to 10 kcal/moles.

A second object of the present invention relates to a catalytic composition active in the (co)polymerization of α-olefins comprising the following components in contact with each other:

i) the above organometallic composition ii) a metallocene complex of a metal of groups 3 to 6 of the periodic table, comprising at least one cyclopentadienyl anion, optionally substituted, penta-hapto ($\eta^5$-)-coordinated to said metal.

Said complex preferably has the following formula (III):

(III)

wherein:

M represents a metal selected from transition metals belonging to groups 3 to 6 of the periodic table, preferably Ti, Zr or Hf;

each $R_A$ independently represents a group of an anionic nature bonded to the metal M, different from cyclopentadienyl or cyclopentadienyl substituted;

"w" is an index which have whole values 1, 2 or 3 depending on whether the valence of M is 3, 4 or 5 respectively;

the symbol "A" represents an anionic ligand having from 5 to 30 carbon atoms, comprising an 5-cyclopentadienyl ring coordinated to the metal M, $R_B$ can have, regardless of the nature of the other substituents, any of the meanings defined above for the ligand A and for the group $R_A$, and can also be connected to said group A by means of a divalent organic group having from 1 to 15 carbon atoms, to form a so-called "bridged" metallocene complex.

Any other possible objects of the present invention will appear evident from the following description and examples.

The term "(co)polymerization of α-olefins" as used hereunder in the text and claims, refers to both the homopolymerization and copolymerization of α-olefins with each other or with another ethylenically unsaturated polymerizable compound.

Organometallic Composition

In accordance with the present invention, the above fluorinated organic compound (A) having formula (I) is characterized by the presence in the molecule of a di-unsaturated cycle having 5 or 6 carbon atoms, that is a cyclopentadienyl ring or a 1,4-cyclohexadienyl ring, depending on whether the value of "m" in formula (I) is 0 or 1 respectively. Compounds having formula (I) with "m"=0 are however preferred due to their greater activating capacity in (co)polymerization processes of α-olefins.

Each of the groups from $R_1$ to $R_7$ which form the substituents on said di-unsaturated cycle can, when taken individually, be hydrogen, fluorine or a monovalent hydrocarbyl group, aliphatic or aromatic, optionally fluorinated. Typical non-limiting meanings of the groups $R_1$–$R_7$ are hydrogen, fluorine, methyl, trifluoromethyl, ethyl, pentafluoroethyl, 2,2,2-trifluoroethyl, 1,1-difluoroethyl, heptafluoroisopropyl, 1,1-difluorohexyl, perfluorocyclohexyl, pentafluorophenyl, ortho-, meta- and paranonafluorodiphenyl, 2,4,6-trifluorophenyl, 2,3,5-trifluorophenyl, 1,1-difluorobenzyl, heptafluorobenzyl, pentafluorophenylmethyl, 2,6-bis(trifluoromethyl)phenyl, 2,6-difluoro-4-trifluoromethylphenyl, etc. Fluoro, trifluoromethyl, pentafluorophenyl, ortho-, meta- or parabis(trifluoromethyl)phenyl groups, are preferred as fluorinated groups due to the high activating capacity they confer and the commercial availability of the precursors of the compounds having formula (I) substituted with these groups.

When two or more of the $R_1$—$R_7$ groups are joined to each other to form cyclic structures comprising two atoms of the di-unsaturated cycle having formula (I), said $R_i$ groups (i=1–7) are formally divalent, and can be saturated or unsaturated to form saturated, unsaturated or aromatic rings, condensed with the first di-unsaturated cycle, preferably having from 5 to 8 carbon atoms, more preferably aromatic rings with 6 atoms. In this way compounds having formula (I) consisting of condensed di- or poly-cyclic structures, are formed.

According to a preferred aspect of the present invention, the two groups $R_1$ and $R_2$, and optionally also the two groups $R_3$ and $R_4$ in the compound having formula (I) with "m" equal to 0, consist of fluorinated vinyl groups as defined above, which are bonded to each other on the second unsaturated carbon so as to form one, or optionally two aromatic rings condensed with said di-unsaturated cycle. In this way, indenes or fluorenes are formed, respectively, substituted on each aromatic ring with at least two groups selected from fluorine, fluorinated alkyl or fluorinated aryl, in accordance with the requisites of the compounds having formula (I).

Among these polycyclic compounds, fluorenes, and especially fluorenes having from 6 to 8 fluorine atoms arranged however on the two aromatic cycles, are particularly preferred.

The compound having formula (I) preferably comprises from 5 to 50 carbon atoms and from 4 to 25 fluorine atoms. More preferably, said compound is a substituted cyclopentadiene compound ("m"=0) having from 9 to 40 carbon atoms and from 8 to 25 fluorine atoms.

For example, compounds having formula (I) with "m"=1 are perfluorocyclohexa-1,4-diene, 1,2,3,4,5,6,6-heptafluorocyclohexa-1,4-diene, 1,2,4,5-tetrakis(pentafluorophenyl)cyclohexa-1,4-diene, 1,2,4,5-tetrakis(trifluoromethyl)cyclohexa-1,4-diene, 9,10-dihydroperfluoroanthracene, 10,10-H,H-perfluoro-9-phenyl-9,10-dihydroanthracene.

Typical examples of fluorinated compounds having formula (I) with "m"=0 are fluorinated cyclopentadienes with at least three fluorine atoms on the ring, or, cyclopentadienes substituted with trifluoromethyl groups. Also included in the scope of formula (I) are cyclopentadiene derivatives condensed with one or two widely fluorinated aromatic rings, such as hexafluoro-indene or octafluorofluorene. Other examples of compounds having formula (I) are indenes and fluorenes hydrogenated on the aromatic rings such as 4,4,7,7-tetrafluoro-4,5,6,7-tetrahydroindenes substituted with at least two fluorine atoms or two pentafluorophenyl groups on the cyclopentadienyl ring, and 1,1,4,4,5,5,8,8-octafluoro-1,2,3,4,5,6,7,8-octahydrofluorenes and the corresponding compounds substituted with a pentafluorophenyl group in position 9.

According to a preferred embodiment of the present invention, in the compounds having formula (I) "m" is equal to 0 and $R_5$ is selected from fluorine, pentafluorophenyl, nonafluorodiphenyl, bis(trifluoromethyl)phenyl and tris(trifluoromethyl)phenyl.

According to a further embodiment of the present invention, 1,2,3,4,5,6,7,8-octafluorofluorenes wherein $R_5$ is fluorine, trifluoromethyl, pentafluorophenyl or bis(trifluoromethyl)phenyl, are preferred as compounds having formula (I).

Other specific and non-limiting examples of said compounds having formula (I) are: 1,2,4-tris-(pentafluorophenyl)cyclopentadiene, 1,2,3-tris-(pentafluorophenyl)cyclopentadiene, 1,2,3,4-tetrakis-(pentafluorophenyl)cyclopentadiene, 1,2,3,4,5,6,7,8-octafluorofluorene, 1,2,3,4,5,6,7,8-octafluoro-9-(2,4-bis-trifluoromethylphenyl)fluorene, 1,2,3,4,5,6,7,8-octafluoro-9-(3,5-bis-trifluoromethylphenyl)fluorene, 1,2,3,4,5,6,7,8-octafluoro-9-(pentafluorophenyl)fluorene, 1,2,3,4,5,6,7,8-octafluoro-9-(nonafluorodiphenyl)fluorene.

Mixtures of these cyclic compounds having formula (I) are equally suitable as component (A) of the activating or ganometallic compositions of the present invention.

Some of the compounds included in formula (I) are known in literature, and their synthetic methods are described. For example, pentafluorocyclopentadiene, octafluorofluorene, 9-pentafluorophenyloctafluoro-fluorene, 1,2,3,4,5-pentakis(trifluoromethyl)cyclopentadiene, 1,4-bis(pentafluorophenyl)cyclopentadiene, 10,10-H,H-perfluoro-9-phenyl-9,10-dihydroanthracene.

Particularly preferred are fluorinated cyclopentadienyl compounds of formula (I) having the following formula (IV):

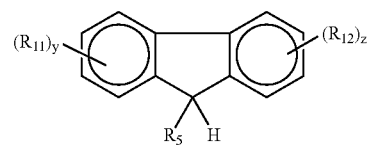

wherein:
$R_5$ has the same meaning defined for formula (I);
(y) is an integer from 1 to 4;
(z) is an integer from 1 to 4;
the groups $R_{11}$ and $R_{12}$ are independently substituents of hydrogen atoms of the respective aromatic ring in one or more of the four positions available, and are selected from fluorine or an aliphatic or aromatic, fluorinated or non-fluorinated hydrocarbyl group, having from 1 to 20 carbon atoms, optionally joined to a different hydrocarbyl group $R_{11}$ or $R_{12}$, respectively, to form an additional cycle; on the condition that at least 3, preferably at least 4, of the groups $R_5$, $R_{11}$ and $R_{12}$, are independently selected from the group consisting of:
fluorine, or
a fluorinated alkyl group having the formula —CF($R_9R_{10}$), wherein each $R_9$ or $R_{10}$ group can have any of the above meanings of the $R_1$ groups and at least one of these is fluorine, or fluorinated alkyl at least in position 1, or a fluorinated aryl $Ar_F$ as defined below, or a fluorinated vinyl group $V_F$ as defined below, or
a fluorinated aryl group $Ar_F$ substituted on the aromatic ring with at least two groups selected from fluorine, a —CF($R_9R_{10}$) group as defined above or a different ArF group, or
a fluorinated vinyl group $V_F$ substituted on at least two positions of the double bond with groups selected from fluorine, a —CF($R_9R_{10}$) group or an $Ar_F$ group as defined above.

In a preferred form, in the compounds having formula (IV) all eight $R_1$, and $R_{12}$ are equal to each other and are trifluoromethyl, or even more preferably fluorine.

The above compounds having formula (I) and formula (IV) can generally be prepared by adapting the usual synthetic methods of organic chemistry for the purpose, using the specific precursors and known reactions which experts in the field are able to identify on the basis of the structure of the desired compound. Examples of specific processes are described by R. Filler et al. in the publication "Journal of Organic Chemistry", vol. 45 (1980), page 1290; by Vlasov V. M. et al. in the publication reviewed in "Chemical Abstract" vol. 90 (1979), Nr. 90:86522q; by Mark J. B. et al. in "Journal of the American Chemical Society", vol. 113 (1991), pages 2209–2222; by P. A. Deck et al. in "Organometallics" vol. 15 (1996), pages 5287–5291; by V. M Vlasov in "Journal of Fluorine Chemistry" Vol. 9 (1977), pages 321–325.

Other synthetic methods of said fluorinated cyclic compounds having formula (I) or formula (IV) are described in published European patent application EP-A 1013675 mentioned above, whose contents should be considered as being an integral part of the present invention as reference.

Component (B) of the activating organometallic composition according to the present invention, consists, in its widest sense, of an organometallic compound which is sufficiently basic as to react with the acid hydrogen of the compound having formula (I) according to a typical acid base reaction, i.e. by extracting an $H^+$ ion and forming the corresponding anion. This reaction is normally effected in a suitable aprotic solvent, but it can also take place by contact of the pure compounds.

Component (B) is preferably an organometallic compound having the following formula (II)

$$M'R_nX_{(p-n)} \quad (II)$$

wherein:

M' is a metal of group 1, 2 or 13 of the periodic table of elements, preferably an alkaline or earth-alkaline metal, more preferably Li or Mg, each R is independently a hydride, a hydrocarbyl group preferably alkylic, having from 1 to 20, preferably from 1 to 10, carbon atoms, or an alkyl- or aryl-amide group having from 1 to 20, preferably from 1 to 10, carbon atoms;

each X is a halogen atom, preferably chlorine or bromine,

"p" is the valence of M',

"n" is a decimal number ranging from 1 to p, preferably p.

Said compound having formula (II), if MI belongs to groups 2 or 13, may also contain halogen atoms, especially chlorine, as well as the alkyl part.

Non-limiting examples of these compounds are: lithium and sodium alkyls such as methyl-lithium, ethyl-lithium, sodium ethyl, sodium isopropyl, lithium cyclohexyl, lithium butyl, lithium hexyl, Grignard reagents such as methylmagnesium chloride, ethylmagnesium chloride, octylmagnesium chloride and phenylmagnesium chloride; magnesium dialkyls such as magnesium diethyl, magnesium dibutyl etc.; aluminum alkyls and aluminum alkyl halides such as aluminum triethyl, aluminum tri-isobutyl, aluminum tri-n-hexyl, aluminum tri-n-octyl, aluminum isoprenyl, aluminum diethylchloride, aluminum dibutylchloride, aluminum-ethyl sesquichloride, aluminum di-iso-butyl chloride and aluminum di-n-octyl chloride, aluminum triisoprenyl or their mixtures.

Other compounds included in formula (II) are hydrides, especially if M' is an alkaline metal, such as lithium hydride, sodium hydride, lithiumaluminum hydride.

Examples of metal-amides included in the above formula (II) are lithium-methylamide, sodiumamide, sodiumethylamide, sodiumdiethylamide, lithiumdiethylamide, lithiumdiisopropylamide, potassiumamide, potassiumdiisopropylamide, lithiumdibutylamide, lithiumdihexylamide.

Many of these organometallic compounds are known in the art and some are commercially available.

Metal-alkyls particularly suitable as component (B) of the composition according to the present invention are compounds having the formula $R^8M^*$ wherein $M^*$ is an alkaline metal, preferably lithium, and $R^8$ is a monovalent, aliphatic or aromatic hydrocarbon group, having from 1 to 8 carbon atoms.

Component (C) of the activating organometallic composition according to the present invention consists of a weakly coordinating aprotic polar compound. These compounds are characterized by a medium to high polarity of the molecule and consequently by a relatively high dielectric constant (conventionally indicated with the symbol "ε"), preferably equal to or higher than 2.0, more preferably equal to or higher than 3.0, even more preferably ranging from 3.0 to 20.0. They must also have a low coordinating capacity.

In accordance with the present invention, the coordinating capacity of a chemical compound is defined according to what is specified in the publication of V. Guttmann "Coordination Chemistry Review", vol. 18 (1976), pages 229–231, whose contents are included herein as reference. In particular, the coordinating capacity of a compound C (also known as "donicity", abbreviated DN) is defined by the equation:

$$DN_C = -\Delta H_{C\text{-}SbCl5}$$

wherein $\Delta H_{C\text{-}SbCl5}$ is the molar enthalpy expressed in kcal, measured by the interaction of C with $SbCl_5$ in a very dilute solution of dichloroethane.

A compound suitable for use as component (C) according to the present invention preferably has a DN coordinating capacity equal to or lower than 10 kcal/mole, more preferably ranging from 0.5 to 8.0 kcal/mole, even more preferably ranging from 1.0 to 5.0 kcal/mole.

For the purposes of the present invention, it is also preferable for said component (C) to be chemically inert (i.e. only causing reversible physical or physico-chemical interactions) towards any of components (A) or (B) of the above activating organometallic composition, or towards component (ii) of the above catalytic composition comprising a metallocene.

Component (C) of the activating organometallic composition according to the present invention preferably consists of a compound or a mixture of weakly coordinating polar compounds, which contain carbon and/or silicon atoms, and one or more heteroatoms or heterogroups, such as, for example, halogens, preferably chlorine or fluorine, with an electron-attracting function, and O, N, P or S atoms, made weakly coordinating by the sterical hindrance of adjacent substituents, or as a result of said electron-attracting function, such as for example, in electronically poor compounds such as pentafluoroanisole (abbreviated PFA), or in ethers, carbonates or sterically hindered amines such as 2,6-di-t-butylaniline, 2,3,4,5-tetramethyltetrahydrofuran or 2,5-di-t-butylfuran.

Component (C) of the present invention preferably consists of a non-polymeric compound having from 1 to 30 carbon atoms, or a mixture of said compounds, even though non-coordinating polar polymeric compounds having more than 30 carbon atoms are not excluded from the scope of the present invention.

Typical non-limiting examples of compounds which can be used as component (C) in the present invention are:

halogenated ethers such as 3-perfluorohexyl-1,2-epoxypropane, 3-(2,2,3,3-tetrafluoropropoxy)-1,2-epoxypropane, 2-trifluoromethyltetrahydrofuran, 1,1,2,2-tetrafluoromethylther, 1,1,2-trifluoro-2-chloroethyl-2,2,2-trifluoroethylether, 2,2,2-trifluoroethylethylether, 2,2,2-trifluoroethyltritylether, 2,5-difluorotetrahydrofuran, 2,2,2-trifluoroethyltrimethylsilylether, 2,2,2-trifluoroethyltriphenylsilylether, 2-methoxy-1,1,1-trifluoropropane, 2,2,2-trifluoroethoxycyclohexane, pentafluoroanisole, 2,5-bis(trifluoromethyl)tetrahydrofuran, 2,6-bis(trifluoromethyl)pyrane;

halogenated amines such as pentafluoropyridine, 2-fluoropyridine, 3-fluoropyridine, 2,6-difluoropyridine, perfluoro-N-methylmorpholine, N-trifluoromethylpyrrole;

sterically hindered and/or electronically stabilized amines or ethers such as N,N-dimethylaniline, N,N-dimethyl-2,6-dimethylaniline, 2,6-di-t-butylpyridine, 1,3-dimethoxybenzene, tetramethyltetrahydrofuran, 2,5-di-t-butyltetrahydrofuran.

Compounds particularly suitable for the purpose are organic compounds comprising an atom selected from O, N, P and S, bonded to at least one fluorinated carbon atom or to a fluorinated aromatic ring. Polyfluorinated ethers and polyfluorinated pyridines are particularly preferred.

The determination of the $DN_C$ coordinating capacity of an organic compound, suitable as component (C) according to the present invention, can be easily effected by experts in the field on the basis of the method described in the above publication of V. Guttmann, using a Suitable calorimetric equipment available on the market.

In the activating organometallic composition according to the present invention, the components (A), (B) and (C) are preferably present in molar ratios (B)/(A) ranging from 1 to 100. It has been found that the use of molar ratios (B)/(A) greater than 100 is of no particular advantage to the catalytic system, but is inconvenient as it increases the total quantity of metal M' which remains in the olefinic polymer at the end of the polymerization. Particularly preferred molar ratios (B)/(A) range from 1.0 to 10.

The moles of component (C) in the organometallic composition according to the present invention are normally in excess with respect to the moles of the organometallic compound (B); the ratio between the moles of (C) and the moles of (B) preferably ranges from 5 to 5,000, more preferably from 10–500.

With reference to the quantity of component (B) effectively used for the preparation of the composition according to the present invention, it should be pointed out that this can significantly vary depending on the procedure relating to its subsequent use in the catalytic composition for the (co) polymerization of α-olefins.

It is in fact known in the art that hydrocarbyl compounds, especially aliphatic, of metals of groups 1, 2 and 13 of the periodic table, and among these particularly lithium, magnesium and aluminum alkyls (i.e. included in the definition of the organometallic compound (B)), can also be used to varying degrees to favour the activation of the metallocene complex having formula (III), when the $R_4$ groups are different from alkyl or aryl, or (according to what is already specified, for example, in the publication "Journal of Polymer Science, part A", vol. 32 (1994), pages 2387–2393), as scavenger to guarantee the removal or deactivation of impurities poisoning the catalytic principle, possibly present in the reactor or polymerization solvent or in the monomers themselves. The portions of component (B) used in the various preparation phases of the catalytic composition and polymerization process, contribute to determining the total quantity of metal contained in the olefinic polymer obtained at the end of the polymerization, and represent a critical parameter which should normally be as low as possible to give the polymer particularly desirable properties, such as, for example, a good insulating capacity, or to avoid food contamination.

Furthermore, as will be dealt with in more detail later on, in the formation of the catalytic composition according to the present invention (activating organometallic composition+metallocene complex having formula (III)), it is possible to both pre-activate a non-alkyl metallocene complex, for example with a lithium alkyl or an aluminum alkyl, before contact with the actual activating organometallic composition, and also to put the metallocene in contact with an activating organometallic composition comprising components (A) and (C) in the appropriate proportions, whereas component (B) having formula (II) can be conveniently dosed in a greater quantity if the metallocene complex is, for example, chlorinated, and in a lesser quantity is the metallocene complex is already alkylated.

With reference to the present invention, the quantities of said component (B) as a ratio with component (A), as specified in the present description and claims, do not comprise the metal alkyl having formula (II) optionally used as scavenger, which is normally charged into the final preparation phase of the polymerization reactor, with concentrations ranging from 0.5 to 1 mmoles/L with respect to the volume of the polymerization mixture, and, if necessary, may also be different from the metal alkyl used in the formulation of the activating organometallic composition.

The activating organometallic composition according to the present invention is preferably prepared in a suitable hydrocarbon solvent, in an inert atmosphere, usually nitrogen or argon, by contact of components (A), (B) and (C), in the desired proportions. The reaction between the components takes place rapidly within a wide temperature range, although temperatures ranging from −20° C. to +20° C. are preferred for the greater stability of the activating organometallic composition.

Suitable solvents for the preparation of said activating organometallic composition are, for example, aromatic hydrocarbon solvents, such as toluene, xylenes, tetraline, or aliphatic hydrocarbon solvents such as cyclohexane, dimethylcyclohexane, decane, decaline, heptane, and the corresponding halogenated hydrocarbons, especially fluorinated. Mixtures of these hydrocarbons can be equally used if necessary.

According to a preferred embodiment of the present invention, said activating organometallic composition is not isolated, but is maintained in the form of a solution or suspension (when insoluble particulate is formed) and added in this form to the metallocene compound having formula (III), optionally subjected to pre-alkylating treatment, to form the catalytic composition. Activating organometallic compositions in the form of a solution are particularly preferred. If suspended particulate is formed during the preparation, this can be conveniently removed by filtration or another suitable separation method.

According to the present invention, it is not to be excluded however that the three components (A), (B) and (C) can be put in contact with each other also in the presence of a metallocene complex having formula (III) in order to obtain the formation of the desired catalytic composition in a single step.

The Catalytic Composition

The metallocene complex having formula (III) which forms component (ii) of the catalytic composition of the present invention can comprise either a single cyclopentadienyl ligand A, or two cyclopentadienyl ligands when $R_B$ has this meaning.

When $R_B$ is not a cyclopentadienyl group, $R_A$ and $R_B$ are preferably selected from hydride, halide, more preferably chloride or bromide, a hydrocarbyl or halogenated hydrocarbyl radical having from 1 to 30, preferably from 1 to 10, carbon atoms, different from cyclopentadienyl, a phosphonate, sulfonate or carbonate group, an alkoxy, carboxy or aryloxy group having from 1 to 20, preferably from 1 to 10, carbon atoms, an amide group, an organic group having from 1 to 20, preferably from 1 to 10, carbon atoms, bonded to the metal M with an amide nitrogen atom, an organic group having from 1 to 20, preferably from 1 to 10, carbon atoms, bonded to the metal M with a silicon atom.

Complexes having formula (III) wherein $R_B$ is different from cyclopentadienyl are known in the art as monocyclopentadienyl complexes. A particular category of these complexes is that of so-called "constrained metallocenes", wherein the $R_B$ group, preferably an alkyl, alkylsilyl or alkylamide group, is "bridge"-bonded with the only cyclopentadienyl group of the complex. These complexes are described for example in published patent applications EP-A 420,436, EP-A 418,044, EP-A 416,815.

When $R_B$ is a cyclopentadienyl group, the complexes having formula (III) are called bis-cyclopentadienyls, and form a group of compounds well known in the art, especially for their capacity for forming catalytic compositions for the polymerization of α-olefins.

Complexes of metals of group 4 of the periodic table of elements, comprising two cyclopentadienyl ligands, suitable as component (ii) according to the present invention, are particularly those represented by the following formula (V):

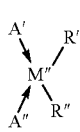

(V)

wherein:
  M" represents a metal selected from titanium, zirconium or hafnium;
  each A' or A" independently represents an organic group containing an $\eta^5$-cyclopentadienyl ring of an anionic nature, coordinated to the metal M";
  each R' or R" independently represents a group of an anionic nature σ-bonded to the metal M, preferably selected from hydride, halide, a $C_1$–$C_{20}$ alkyl or alkylaryl group, a $C_3$–$C_{20}$ alkylsilyl group, a $C_5$–$C_{20}$ cycloalkyl group, a $C_6$–$C_{20}$ aryl or arylalkyl group, a $C_1$–$C_{20}$ alkoxyl or thioalkoxyl group, a $C_2$–$C_{20}$ carboxylate or carbamate group, a $C_2$–$C_{20}$ dialkylamide group and a $C_4$–$C_{20}$ alkylsilylamide group.

According to the present invention, in particular, the groups R' and R" having formula (V) each independently represent a group of an anionic nature σ-bonded to the metal M". Typical examples of R' and R" are hydride, halide, preferably chloride or bromide, a linear or branched alkyl group such as methyl, ethyl, butyl, isopropyl, isoamyl, octyl, decyl, benzyl, an alkylsilyl group such as, for example, trimethylsilyl, triethylsilyl or tributylsilyl, a cycloalkyl group such as cyclopentyl, cyclohexyl, 4-methylcyclohexyl, an aryl group such as phenyl or toluyl, an alkoxyl or thioalkoxyl group such as methoxyl, ethoxyl, iso- or sec-butoxyl, ethylsulfide, a carboxylate group such as acetate, trifluoroacetate, propionate, butyrate, pivalate, stearate, benzoate, or again, a dialkylamide group such as diethylamide, dibutylamide, or alkylsilylamide group, such as bis(trimethylsilyl)amide or ethyltrimethylsilylamide. The two groups R' and R" can also be chemically bonded to each other to form a cycle having from 4 to 7 atoms different from hydrogen, also comprising the metal M". Typical examples of this aspect are divalent anionic groups such as the trimethylene or tetramethylene group, or the ethylenedioxy group. R' and R" groups particularly preferred for their accessibility and simple preparation of the complexes containing them are chloride, methyl and ethyl.

According to the present invention, each group of an anionic nature A in formula (III) and A' or A" in formula (V) contains an $\eta^5$-cyclopentadienyl ring coordinated to the transition metal M or M" respectively, which formerly derives from a cyclopentadiene molecule, substituted or non-substituted, by the extraction of an $H^+$ ion. The molecular structure and typical electronic and coordinating configuration of the metallocene complexes of titanium, zirconium or hafnium generally comprising two $\eta^5$-cyclopentadienyl groups has been widely described in literature and is known to experts in the field.

In the most general form of the present invention, a divalent organic group, preferably containing from 1 to 20 carbon atoms, and optionally also one or more heteroatoms selected from silicon, germanium and halogens, can be bonded to any of the carbon atoms of the cyclopentadienyl ring of groups A' and A" having formula (V) respectively (provided that a bond valence is available).

Preferred A' and A" groups are the known cyclopentadienyl, indenyl or fluorenyl groups, and their homologous products, in which one or more carbon atoms of the molecular skeleton (included or not included in the cyclopentadienyl ring), are substituted with a radical selected from the group consisting of halogen, preferably chlorine or bromine, a linear or branched alkyl group having from 1 to 10 carbon atoms, optionally halogenated, such as methyl, trifluoromethyl, ethyl, butyl, isopropyl, isoamyl, octyl, decyl, benzyl, an alkylsilyl group such as, for example, trimethylsilyl, triethylsilyl or tributylsilyl, a cycloalkyl group such as cyclopentyl, cyclohexyl, 4-methylcyclohexyl, an aryl group having from 6 to 10 carbon atoms, optionally halogenated, such as phenyl, pentafluorophenyl or toluyl, an alkoxyl or thioalkoxyl group such as methoxyl, ethoxyl, iso- or sec-butoxyl, ethylsulfide, or again, a dialkylamide group such as diethylamide, dibutylamide, or alkylsilylamide, such as bis(trimethylsilyl)amide or ethyltrimethylsilylamide. Said groups A' or A" may also comprise several condensed aromatic rings, as in the case, for example, of 4,5-benzoindenyl. Particularly preferred A' or A" groups are cyclopentadienyl, indenyl, 4,5,6,7-tetrahydroindenyl, fluorenyl, azulenyl and the corresponding methyl-substituted groups.

Typical examples of complexes having formula (III) and/or (V) suitable for the purposes of the present invention are the following compounds, which however in no way limit the overall scope of the present invention. $(\eta^5-C_5H_5)_2 TiCl_2$; $[Me_2Si\ (\eta^5-C_5\ Me_4)(NBu^t)]TiCl_2$; $(\eta^5-C_5H_5)_2 TiClMe$; $[1,2\text{-en}\ (\eta^5\text{-Ind})_2]TiMe_2$; $(\eta^5-C_5H_5)_2TiCl_3$; $(\eta^5-C_5Me_5)_2TiCl_2$; $(\eta^5-C_5Me_5)_3TiCl$; $[1,2\text{-en}\ (\eta^5\text{-Ind})_2]TiCl_2$; $(\eta^5-C_5H_5)Ti(OCOMe)_3$; $(\eta^5-C_5H_5)_2Ti(OCOPh)_2$; $(\eta^5\text{-}(3,5\text{-}(CF_3)_2Bz)C_5H_5)_2TiCl_2$; $(\eta^5\text{-Ind})Ti(OCOMe)_3$;

($\eta^5$—C$_5$Me$_5$)Ti(OCOMe) 3; [o-Xen-($\eta^5$-(THInd)$_2$]TiCl$_2$; ($\eta^5$-Ind) Ti (OCOCF$_3$)$_2$[$\eta^5$-(4—CF$_3$Bz) C$_5$H$_4$]$_2$TiCl$_2$; [$\eta^5$-1,3-(CF$_3$)$_2$—C$_5$H$_3$]Ti(OCOMe)$_2$; ($\eta^5$—C$_5$H$_5$)Ti (OCO CF$_3$)$_2$; [1,2-en($\eta^5$-1-(4—CF$_3$Bz)Ind)$_2$]TiMe$_2$; (S$^5$—C$_5$H$_5$) Ti (OCOPh)3; [Pr$^j$($\eta^5$—C$_5$H$_5$) (1$^5$-Flu)] TiCl$_2$; o-bzn-[1-(3-Me-$\eta^5$-Ind)]$_2$TiCl$_2$; o-bzn-[1-(4,7-Me$_2$)-$\eta^5$-Ind]$_2$TiBZ$_2$; [1,2-en($\eta^5$-Ind)$_2$]ZrCl$_2$; o-bzn-[1-($\eta^5$-THInd]$_2$TiCl$_2$; [Ph$_2$Si (l$^5$-Ind)$_2$]ZrCl$_2$; ($\eta^5$-THInd)$_2$ZrCl$_2$; ($\eta^5$—C$_5$H$_5$)$_2$ZrCl$_2$; o-bzn-[1-(4,7-Me$_2$)-$\eta^5$-Ind]$_2$TiBr$_2$; ($\eta^5$-Ind)Zr(NMe$_2$)$_3$; [Pr$^j$ ($\eta^5$—C$_5$H$_5$) ($\eta^5$-Flu)]ZrCl$_2$; ($\eta^5$—C$_5$H$_5$)$_2$ZrCl (NMe$_2$); ($\eta^5$—C$_5$Me$_5$)$_2$ZrMe$_2$; [1,2-en ($\eta^5$-THInd) 2] ZrCl$_2$; ($\eta^5$-Ind)$_2$ Zr(NMe$_2$)$_2$; [Pr$^j$($\eta^5$—C$_5$H$_5$) ($\eta^5$-Flu)]ZrCl$_2$; ($\eta^5$—C$_5$H$_5$)$_2$ ZrCl(NMe$_2$); [Me$_2$Si($\eta^5$-Ind)$_2$]HfCl$_2$ ($\eta^5$—C$_5$Me$_5$)$_2$ ZrCl$_3$; [1,2-en (11$^5$-THInd) 2] ZrMe$_2$ [o-Xen($\eta^5$-Ind) 2] ZrCl$_2$, ($\eta^5$—C$_5$Me$_5$) Zr (OCOPh) 3 ($\eta^5$—C$_5$Me$_5$)$_2$ZrBz$_2$, ($_5$-THInd)$_2$Zr (OCOCF$_3$)$_2$; [$\eta^5$-(2,4-(CF$_3$)$_2$Bz)C$_5$H$_4$]$_2$ ZrCl$_2$; [Me$_2$Si(CH$_2$-$\eta^5$—C$_5$H$_4$)$_2$ZrCl$_2$; [o-Xen-($\eta^5$—C$_5$H$_5$) 2] ZrCl$_2$; [1,2-en ($\eta^5$-1-(2,4—CF$_3$)$_2$Bz)Ind)$_2$]ZrCl$_2$; [o-Xen-($\eta^5$-THInd)$_2$]ZrCl$_2$; [$\eta^5$-(2,4-CF$_3$)$_2$Bz) C$_5$H$_4$]$_2$ZrCl (NMe$_2$); [o-Xen-($\eta^5$—C$_5$H$_5$) (p$^5$-Flu)] ZrCl$_2$; [$\eta^5$-(4-F-Ph) C$_5$H$_4$]$_2$ZrCl$_2$; [o-Xen-($\eta^5$—C$_5$Hs) 2] ZrMe$_2$; [o-Xen-($\eta^5$-THInd) 2] ZrBz$_2$; [$\eta^5$—C$_5$Me$_5$]$_2$ZrCl$_2$; [Me$_2$Si (CH$_2$)$_2$—($\eta^5$—Ph—C$_5$H$_3$)$_2$[ZrCL$_2$; o-Bzn[1-(5,6-(Me)$_2$Ind)]$_2$ZrCl$_2$; o-Bzn-[1-(4,7-Me$_2$)Ind]$_2$ZrCl$_2$; o-Bzn-[1-(4,7-difenil)-$\eta^5$-Ind]$_2$ZrMe$_2$; o-Bzn-(Flu)$_2$HfCl; o-Bzn-(1-(-$\eta^5$-THInd)$_2$ ZrCl$_2$; o-Bzn-[$\eta^5$-C$_5$Me$_4$]$_2$ZrCl$_2$ o-Bzn-[1(3-Me)-$\eta^5$-Ind]$_2$ HfCl$_2$; [Me$_2$Si ($\eta^5$—C$_5$H$_4$)$_2$]HfCl$_2$; o-Bzn-($\eta^5$-Ind)$_2$Zr (OCO-n-C$_3$H$_7$)$_2$; [Me$_2$Si($\eta^5$-(1-Ind)$_2$] HfCl$_2$; [Me$_2$Si ($\eta^5$-THInd)$_2$]HfCl$_2$; o-Bzn-[1-$\eta^5$-(3-Me)Ind]$_2$HfCl$_2$. In the above formulae the following abbreviations were used: Me=Methyl, Et=ethyl, But=tert-butyl, Bz=benzyl, Pri=2,2-isopropylidene, Ind=indenyl, THInd=4,5,6,7-tetrahydro-indenyl, Flu=fluorenyl, 1,2-en=1,2-ethylidene, Ph2Si=diphenylsilylene, Me2Si=dimethylsilylene, o-Xen=ortho-xylylene, o-Bzn=ortho-benzylidene.

The catalytic composition according to the present invention comprises and is obtained by contact of the above components (i) and (ii). The selection of the metallocene component (ii) can be made each time by experts in the field on the basis of the usual industrial projecting criteria, selecting the metallocene complex with optimum characteristics and properties in relation to the various parameters of the polymerization process to be effected.

Also included in the scope of the present invention are those catalytic compositions comprising two or more complexes having formula (III) or (V) mixed with each other. Catalytic compositions of the present invention based on mixtures of metallocene complexes having different catalytic behaviour can, for example, be advantageously used in polymerization when a wider molecular weight distribution of the polyolefins thus produced, is desired.

As specified above, if the metallocene complex having formula (III) does not comprise sufficiently reactive R$_A$ groups, such as for example hydrocarbyl or halogenated hydrocarbyl, it is preferable, according to the present invention to add to said complex or preformed catalytic composition, a sufficient quantity of a component (iii), consisting of a suitable hydrocarbyl organometallic compound, preferably alkylic, capable of acting as alkylating agent of said complex having formula (III). Said alkylating agent (iii) is preferably selected from organometallic compounds having formula (II), and may also coincide, according to a particular aspect, with the same compound having formula (II) used as component (B) of the above activating organometallic composition.

More preferably, said alkylating agent (iii) is an aluminum alkyl, especially trialkyl, which is independently added to the metallocene complex having formula (III) or (V) to form a suitable alkylated metallocene complex, with an Al/M ratio ranging from 10 to 1000, preferably from 30 to 500, whereas a different compound, especially an alkylderivative of an alkaline or earth-alkaline metal, or an additional quantity of the same aluminum alkyl, is put in contact with components (A) and (C) for the formation of said activating organometallic composition (i), according to what is described above.

Alternatively, the whole compound having formula (II), also comprising the alkylating portion of the metallocene complex, can be put in contact with the fluorinated compound having formula (I) or with the metallocene complex having formula (III) and subsequently the missing components are added to the product thus obtained, according to what is specified above, to form the catalytic composition according to the present invention.

According to another aspect of the present invention, in order to produce solid components for the formation of catalysts for the polymerization of olefins, for example for use in polymerization in gas phase, the above complexes can, if necessary, be supported on inert solids, preferably consisting of oxides of Si and/or Al, such as for example, silica, alumina or silico-aluminates, but, when required, also of a polymeric nature, such as certain known polystyrenes functionalized for the purpose. For the supporting of said catalysts, the known supporting techniques can be used, normally comprising contact, in a suitable inert liquid medium, between the carrier, optionally activated by heating to temperatures exceeding 200° C., and one or both of components (i) and (ii) (and optionally (iii)) of the catalyst of the present invention. For the purposes of the present invention, it is not necessary for both components to be supported, as it is also possible for only the complex having formula (III), or the activating organometallic composition which forms component (i), to be present on the surface of the carrier. In this latter case, the component which is not present on the surface is subsequently put in contact with the supported component, when the formation of the active catalyst for the polymerization is desired.

Also included in the scope of the present invention are the catalytic compositions based on the metallocene complexes which have been supported on a solid by means of the functionalization of the latter and the formation of a covalent bond between the solid and a metallocene complex included in the previous formula (III) or (V).

In addition to the two components (i) and (ii), and optionally (iii), one or more other additives or components can be optionally added to the catalytic composition of the present invention, according to what is known in normal practice for the polymerization of olefins, to obtain a catalytic system suitable for satisfying specific requisites. The catalytic systems thus obtained should be considered as being included in the scope of the present invention. Additives or components which can be included in the preparation and/or formulation of the catalytic composition of the present invention are inert solvents such as, for example, aliphatic and/or aromatic hydrocarbons, halogenating agents such as silicon halides, halogenated hydrocarbons, preferably chlorinated, and the like, and again all other possible components normally used in the art for the preparation of traditional homogeneous catalysts of the metallocene type for the (co)polymerization of α-olefins.

Components (i) and (ii) form the catalytic composition according to the present invention by contact with each other, preferably in an inert diluent and at temperatures ranging from room temperature to the temperature selected for the polymerization, which may also be, for certain processes, 150° C. or higher, and for times varying from 10 seconds to 1 hour, more preferably from 1 to 30 minutes. Inert diluents suitable for the purpose are, for example, aliphatic and aromatic hydrocarbons, liquid at room temperature.

The relative quantities between the two components of the present catalytic composition are selected so that the molar ratio [A]/[M], wherein [M] are the moles of metallocene complex having formula (III) or (V) and [A] the moles of fluorinated compound having formula (I), ranges from 0.5 to 50, preferably from 1 to 10. For ratio values higher than 50, there are no significant variations in the results obtained in the polymerization processes.

The catalytic composition according to the present invention can be used with excellent results in substantially all known (co)polymerization processes of α-olefins, either in continuous or batchwise, in one or more steps, such as, for example, processes at low (0.1–1.0 MPa), medium (1.0–10 MPa) or high (10–150 MPa) pressure, at temperatures ranging from 200 to 240° C., optionally in the presence of an inert diluent. Hydrogen can be conveniently used as molecular weight regulator.

Typical α-olefins (co)polymerizable with the catalysts according to the present invention are aliphatic unsaturated hydrocarbons having from 2 to 30 carbon atoms, linear or branched, optionally substituted with one or more halogen atoms, such as fluorine or chlorine, whose molecule contains at least one unsaturated primary group (—CH═CH$_2$). Said unsaturated hydrocarbons may also comprise cyclic groups and/or one or more additional C═C unsaturations, chain-end or internal, conjugated or non-conjugated with said unsaturated primary group. Examples of these α-olefins comprise ethylene, propylene, 1-butene, 4-methylpent-1-ene, 1-hexene, 1-octene, 1-decene, 1-octadecene, 1,4-hexadiene, 1,3-butadiene, ethylidene-norbornene. Ethylene is particularly preferred both in homopolymerization processes to obtain highly crystalline high density polyethylene, and in copolymerization processes with one or more other α-olefins or with non-conjugated dienes, to obtain low density polyethylene (also called LLDPE or VLDPE) or saturated olefinic rubbers (for example EPR) or unsaturated olefinic rubbers (for example EPDM).

These processes can be carried out in solution or suspension in a liquid diluent normally consisting of an aliphatic or cycloaliphatic saturated hydrocarbon, having from 3 to 8 carbon atoms, but which can also consist of a monomer as, for example, in the known co-polymerization process of ethylene and propylene in liquid propylene. The quantity of catalytic composition introduced into the polymerization mixture is preferably selected so that the concentration of the metal M or M" ranges from 10-5 to 10-8 moles/liter.

Alternatively, the polymerization can be carried out in gas phase, for example, in a fluid bed reactor, normally at pressures ranging from 0.5 to 5 MPa and at temperatures ranging from 50 to 150° C.

According to a particular aspect of the present invention, the catalytic composition for the (co)polymerization of α-olefins is prepared separately (preformed) by contact of components (i) and (ii) and optionally (iii), according to the procedure described above, and is subsequently introduced into the polymerization environment. The catalytic composition can be charged first into the polymerization reactor, followed by the reagent mixture containing the olefin or mixture of olefins to be polymerized, or the catalytic composition can be charged into the reactor already containing the reagent mixture or, finally, the reagent mixture and the catalytic composition can be contemporaneously fed into the reactor in a typical process in continuous.

Alternatively, the four essential components, consisting of the catalytic composition, i.e. the three components (A), (B) and (C) and the metallocene complex having formula (III), or preferably (V), can be put in contact and reacted contemporaneously, in suitable proportions, and the catalytic composition thus obtained charged at the appropriate moment into the polymerization environment.

According to another aspect of the present invention, the catalyst is formed "in situ", for example by introducing the preformed components (i) and (ii) and optionally (iii), separately, into the polymerization reactor containing the pre-selected olefinic monomers.

The catalytic compositions according to the present invention can be used with excellent results in the polymerization of ethylene to give linear polyethylene and in the copolymerization of ethylene with propylene or higher α-olefins, preferably having from 4 to 10 carbon atoms, to give copolymers having different characteristics depending on the specific polymerization conditions and on the quantity and structure of the α-olefin. For example, linear polyethylenes can be obtained, with a density ranging from 0.880 to 0.940, and with molecular weights ranging from 10,000 to 2,000,000. The α-olefins preferably used as comonomers of ethylene in the production of low or medium density linear polyethylene (known with the abbreviations ULDPE, VLDPE and LLDPE, depending on the density), are propylene, 1-butene, 1-hexene and 1-octene.

The catalytic composition of the present invention can also be conveniently used in copolymerization processes of ethylene and propylene to give saturated elastomeric copolymers vulcanizable for example by means of peroxides and extremely resistant to aging and degradation, or in the terpolymerization of ethylene, propylene and a non-conjugated diene, having from 5 to 20 carbon atoms, to obtain vulcanizable rubbers of the EPDM type. In the case of these latter processes, it has been found that the catalysts of the present invention allow the production of polymers having a particularly high diene content and average molecular weight, under the polymerization conditions.

Preferred non-conjugated dienes for this purpose are, for example: 1,4-hexadiene and 1,6-octadiene; 5-methyl-1,4-hexadiene; 3,7-dimethyl-1,6-octadiene; 1,4-cyclohexadiene; 1,5-cyclo-octadiene; 5-methylene-2-norbornene, 5-ethylidene-2-norbornene (ENB) and their mixtures.

In the case of EPDM terpolymers, the quantity of diene monomer conveniently does not exceed 15% by weight, and preferably ranges from 2 to 10% by weight. The propylene content on the other hand conveniently ranges from 20 to 50% by weight.

The catalytic composition according to the present invention can also be used in homo- and co-polymerization processes of α-olefins different from ethylene, under the conditions normally used in the art for the corresponding polymerization processes with the known catalysts based on metallocenes, giving, with excellent yields, atactic, isotactic or syndiotactic polymers, depending on the structure and geometry of the activated metallocene complex. α-olefins suitable for the purpose are those having from 3 to 20, preferably from 3 to 10, carbon atoms, optionally substituted with halogen atoms or aromatic nuclei such as, for example, propylene, 1-butene, 1-hexene, 4-methyl-1-pentene, 1-decene and styrene.

The present invention is further described by the following examples, which, however, are provided for purely illustrative purposes and in no way limit the overall scope of the invention itself.

EXAMPLES

The reagents and solvents used in the following examples are pure commercial products, unless otherwise indicated. Before being used, the solvents are subjected to drying or drying distillation according to the conventional methods. The following commercial reagents were used:

| Reagent | Supplier |
| --- | --- |
| Bromopentafluorobenzene | Aldrich |
| butyl-lithium (1,6 M) | Aldrich |
| sodium hydride | Aldrich |
| crown ether 15-crown-5 | Aldrich |
| LiMe in Et$_2$O (1,6 M) | Fluka |
| 1,2-ethylenebis(indenyl)zirconium dichloride | Witco |
| Triisobutyl aluminum (TIBAL) | Witco |
| Pentafluoroanisole (PFA) | Aldrich |

Unless otherwise indicated, all the synthesis reactions and operations preliminary to the polymerization processes, as well as the conservation and handling of the or ganometallic compounds, are effected in an inert atmosphere of nitrogen or argon depending on the specific necessities.

Preparative Example 1

1,2,3,4,5,6,7,8-octafluoro-9-(pentafluorophenyl)-fluorene (VI)

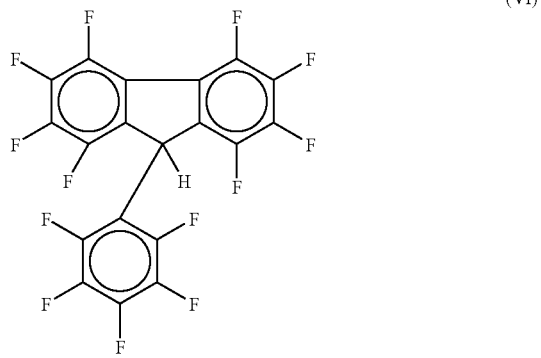

The compound having formula (VI) is obtained according to the procedure described in example 8 of the abovementioned European patent application EP-A 1013675. In accordance with this, 13 ml of butyl-lithium (1,6 M) are added dropwise, over a period of 15 minutes, to an ether solution of 5 g (0.02 moles) of bromopentafluorobenzene (120 ml of anhydrous solvent), cooled to –75° C. The solution is stirred for 30 minutes and 3.24 g (0.0097 moles) of 1,2,3,4,5,6,7,8-octafluorofluorenone, prepared according to the formulation specified in literature (R. D. Chambers and D. J. Spring, J. Chem. Soc. (C), 2394 (1968)), are rapidly added. After 30 minutes under stirring, the solution is poured into water and extracted with ethyl ether. The ether solution, after drying on Na$_2$SO$_4$, is filtered and dried. 20 ml of cold petroleum ether are added to the solid obtained, which is then filtered. It is washed with a small amount of cold petroleum ether and is then dried under vacuum. 4.6 g of white crystalline product consisting of 1,2,3,4,5,6,7,8-octafluoro-9-hydroxy-9-(pentafluorophenyl)fluorene, are obtained.

4.5 g (0.009 moles) of 1,2,3,4,5,6,7,8-octafluoro-9-hydroxy-9-(pentafluorophenyl)fluorene thus prepared, are added to 25 ml (0.26 moles) of PBr$_3$ and heated to 1100C for 30 minutes in an inert atmosphere. The reaction mass is hydrolyzed in ice, extracted with ethyl ether, the extract is washed with an aqueous solution (10%) of NaHCO$_3$, dried on sodium sulfate, filtered and dried. The residue is purified by chromatography on a silica gel column (eluant: petroleum ether/methylene chloride, 98/2), obtaining, after evaporation of the pure fractions, 3.61 g of white crystalline product corresponding to the desired product having formula (VI) (yield 84%) (characterization by means of $^1$H-NMR and $^{19}$F-NMR spectroscopy, in CDCl$_3$).

Preparative Example 2

1,2,3,4,5,6,7,8-octafluoro-9-(2,4-bis-(trifluoromethyl)phenyl)fluorene (VII)

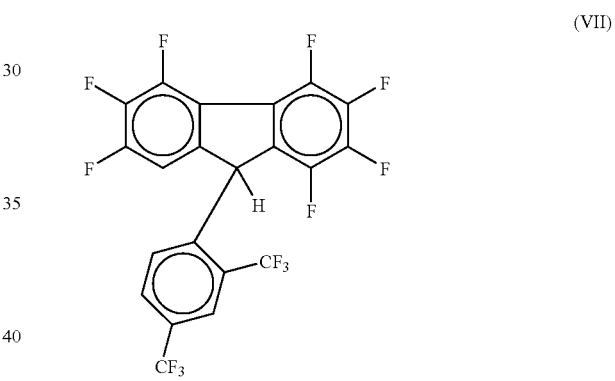

The compound having formula (VII) is obtained according to the procedure described in example 4 of the abovementioned European patent application EP-A 1013675. In accordance with this, 7 ml of butyl-lithium (2,5 M) are added dropwise to a solution of 100 ml of anhydrous ethyl ether containing 5 g (0.017 moles) of 2,4-bis(trifluoromethyl)bromobenzene, cooled to –75° C. After 1 h, 3 g (0.009 moles) of 1,2,3,4,5,6,7,8-octafluorofluorenone, prepared according to the formulation specified in the publication "Journal of the Chemical Society, part (C)", page 2394 (1968)), are rapidly added. The mixture is stirred for 1 hour, is then hydrolyzed in water, the ether phase is separated, dried on Na$_2$SO$_4$, and dried. A small quantity of cold petroleum ether is added to the solid obtained, which is then filtered and dried. 2.55 g of the pure desired product are obtained (yield 52.64% with respect to the octafluorofluorenone).

0.95 g (0.0017 moles) of 1,2,3,4,5,6,7,8-octafluoro-9-hydroxy-9-(2,4-bis-(trifluoromethyl)phenyl)fluorene are heated with 10 ml (0.105 moles) of PBr$_3$ to 110–120° C. for 40 minutes. The reaction mass is hydrolyzed in ice, extracted with ethyl ether, the extract is washed with an aqueous solution of NaHCO$_3$ (10%), dried on Na$_2$SO$_4$, filtered and the ether solution is dried. The residue is purified by chromatography on a silica gel column (eluant: petroleum ether), obtaining, after evaporation of the pure fractions, 0.61 g of a solid white crystalline product consisting of the desired product (VII) (characterization by means of $^1$H-NMR and $^{19}$F-NMR spectroscopy, in CDCl$_3$).

Example 1: (Comparative)

Preparation of a Solution in tetrahydrofuran (THF) of the sodium salt of 1,2,3,4,5,6,7,8-octafluoro-9-(pentafluorophenyl)fluorene (VI)

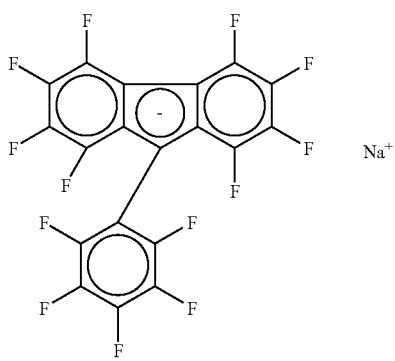

0.096 g (0.2 mmoles) of 1,2,3,4,5,6,7,8-octafluoro-9-(pentafluorophenyl)fluorene (VI), prepared as described above, 10 ml of anhydrous THF and 0.006 g (0.25 mmoles) of NaH, are charged into a 100 ml flask, in which 3 vacuum-nitrogen cycles have been previously effected. The reaction is followed by means of gas-volumetric control of the hydrogen developed. After about an hour of stirring at room temperature, the development of hydrogen corresponded to 99% of the theoretical stoichiometric quantity for the reaction underway. A limpid yellow solution is obtained, which is analyzed by means of $^{19}$F-NMR spectroscopy, and the complete disappearance of the starting compound is observed together with the formation of the desired saline solvated compound, having a concentration of 0.02 M.

$^{19}$F-NMR spectrum (internal standard CFCl$_3$, ppm): −140.97 (m), −144.81 (s), −161.38 (m), −164.42 (m), −168.17 (t), −170.81 (m), −181.70 (m).

Example 2: (Comparative)

Preparation of a Solution in THF of the Sodium Salt of 1,2,3,4,5,6,7,8-octafluoro-9-(pentafluorophenyl)fluorene (VI) in the Presence of Crown ether 15-crown-5 (1,4,7,10,13-pentaoxa-cyclopentadecane)

0.208 g (0.44 mmoles) of 1,2,3,4,5,6,7,8-octafluoro-9-(pentafluorophenyl)fluorene (VI), 20 ml of THF and 0.1 ml (d=1.13g/ml; 0.51 mmoles) of 15-crown-5, are charged into a 100 ml flask, in which 3 vacuum-nitrogen cycles have been previously effected. 0.009 g (0.375 mmoles) of NaH are then added to this solution. After about 1 hour, a limpid yellow solution is obtained, which is analyzed by means of $^{19}$F-NMR spectroscopy, and the complete disappearance of the starting compound is observed, together with the formation of the desired saline solvated compound, having a concentration of 0.02 M.

$^{19}$F-NMR spectrum (internal standard CFCl$_3$, ppm): −141.12 (m), −144.71 (s), −161.55 (m), −164.71 (m), −168.34 (t), −170.93 (m), −181.75 (m).

Example 3: (Comparative)

Preparation of a Solution in ethyl ether of the Sodium Salt of 1,2,3,4,5,6,7,8-octafluoro-9-(pentafluorophenyl)fluorene (VI) in the Presence of Crown ether 15-crown-5 (1,4,7,10,13-pentaoxa-cyclopentadecane)

0.106 g (0.22 mmoles) of 1,2,3,4,5,6,7,8-(pentafluorophenyl)fluorene, 10 ml of THF and 0.05 ml (d=1.13g/ml; 0.25 mmoles) of crown ether 15-crown-5, are charged into a 100 ml flask, in which 3 vacuum-nitrogen cycles have been previously effected. 0.007 g (0.30 mmoles) of NaH are then added to this solution. After about 1 hour, a limpid yellow solution is obtained, which is analyzed by means of $^{19}$F-NMR spectroscopy, and the complete disappearance of the starting compound is observed, together with the formation of the desired saline solvated compound, having a concentration of 0.02 M.

$^{19}$F-NMR spectrum (CFCl$_3$, ppm): −139.22 (quint.), −142.61 (quint.), −159.18 (m), −161.86 (t), −165.91 (m), −168.52 (t), −179.43 (m).

Example 4: (Comparative)

Preparation of a Solution in THF/ethyl ether of the lithium salt of 1,2,3,4,5,6,7,8-octafluoro-9-(pentafluorophenyl)fluorene (VI)

0.102 g (0.2 mmoles) of 1,2,3,4,5,6,7,8-octafluoro-9-(pentafluorophenyl)fluorene and 10 ml of THF are charged into a 100 ml flask, in which 3 vacuum-nitrogen cycles have been previously effected. The solution is then treated at room temperature with 0.02 ml of a 1.6 M solution of LiMe in Et$_2$O (0.32 mmoles of LiMe). After about 30' of stirring at room temperature, a limpid yellow solution is obtained, which is analyzed by means of $^{19}$F-NMR spectroscopy, and the complete disappearance of the starting compound is observed, together with the formation of the desired saline solvated compound, having a concentration of 0.02 M.

$^{19}$F-NMR spectrum (CFCl$_3$, ppm): −141.28 (m), −144.96 (s), −161.68 (m), −165.00 (m), −168.59 (t), −171.19 (m), −182.09 (m).

Example 5

Preparation of an Activating organometallic Composition According to the Present Invention 0.238 g (0.5 mmoles) of 1, 2, 3, 4, 5, 6, 7, 8-octafluoro-9-(pentafluorophenyl)fluorene (VI), obtained according to the previous "preparative example 1", 25 ml of anhydrous toluene and 1 g (5 mmoles) of pentafluoroanilsole (PFA; having a DN$_{PFA}$ coordinating capacity=1.7 Kcal/mole), are charged into a 100 ml flask, in which 3 vacuum-nitrogen cycles have been previously effected. The solution is then cooled to −10° C. and treated with 0.35 ml of a 1.6 M solution of LiBu in hexane (0.64 mmoles of LiBu). The formation of a limpid yellow solution is observed, whose appearance does not undergo substantial variations over a period of 48 hours at a temperature of 0° C. The concentration of the fluorinated compound proves to be 0.019 M. The activating composition thus prepared is conserved in the form of a solution until use.

Example 6

Preparation of an Activating Organometallic composition According to the Present Invention 0,261 g (0.5 mmoles) of 1, 2, 3, 4, 5, 6, 7, 8-octafluoro-9-(2,4-bis-(trifluoromethyl)phenyl)fluorene (VII), obtained according to the previous " preparative example 2ll, 25 ml of anhydrous toluene and 1 g (5 mmoles) of PFA are charged into a 100 ml flask, in which 3 vacuum-nitrogen cycles have been previously effected. The solution is then cooled to −10° C. and treated with 0.35 ml of a 1.6 M solution of LiBu in hexane (0.64 mmoles of LiBu). The formation of a limpid yellow solution is observed, whose appearance does not undergo substantial variations over a period of 48 hours at a temperature of 0° C.; (concentration of the fluorinated corn-pound: 0.019 M). The activating composition thus prepared is conserved in the form of a solution until use.

Example 7

Preparation of a Catalytic Composition According to the Present Invention 0.063 g (0.15 moles) of the metallocene complex 1,2-ethylenebis(indenyl)zirconium dichloride [Et $(Ind)_2ZrCl_2$] and 140 ml of anhydrous toluene, are charged into a 250 ml test-tube. The mixture is left under stirring for 30 minutes until a yellowish solution is obtained. A quantity of the activating organometallic composition in solution, prepared as described above in accordance with example 5, corresponding to a molar ratio (Fluorinated Compound (VI))/((ZR) Complex) equal to 1/1, is added to this solution, cooled to −10° C. The mixture thus obtained is used for various ethylene polymerization tests.

Example 8

Preparation of a Catalytic Composition According to the Present Invention 0.063 g (0.15 mmoles) of the metallocene complex 1,2-ethylenebis(indenyl)zirconium dichloride [Et $(Ind)_2ZrCl_2$] and 140 ml of anhydrous toluene, are charged into a 250 ml test-tube. The mixture is left under stirring for 30 minutes until a yellowish solution is obtained. A quantity of the activating organometallic composition in solution, prepared as described above in accordance with example 6, corresponding to a molar ratio (Fluorinated Compound (VII))/((ZR) Complex) equal to 1/1, is added to this solution, cooled to −10° C. The mixture thus obtained is used for various ethylene polymerization tests.

Example 9

Polymerization of ethylene 1.5 ml of the catalytic composition prepared according to the previous example 7 (Zr=0.0015 mmoles), and 0.45 ml of a solution (0.995 M in toluene) of TIBAL, are charged into a 250 ml glass reactor, equipped with a magnetic stirrer and thermostat-regulated at 25° C. The reactor is pressurized at 0.5 bars with ethylene and the mixture is kept under stirring for 60 minutes, with the continuous feeding of ethylene to keep the pressure constantly at the initial value. At the end, the reactor is depressurized and 5 ml of methanol are introduced to terminate the polymerization and deactivate the catalyst. The polymer is recovered by precipitation in 400 ml of methanol acidified with hydrochloric acid, filtration and drying under vacuum at 40° C. for about 8 hours. 3.5 g of polyethylene are obtained. The data are summarized in Table 1.

Example 10

Polymerization of ethylene

A polymerization test is effected under the same conditions and with the same catalytic composition used in the previous example 9, with the only difference that the catalytic composition (prepared according to example 7) is filtered on a porous septum at a low temperature (−10° C.) before use. 3.7 g of polyethylene are obtained. The data are indicated in Table 1.

Example 11

Polymerization of ethylene

A polymerization test is effected under the same conditions used in the previous example 9, with the only difference that the catalytic composition (prepared according to example 7) is obtained using the activating organometallic composition of example 5 conserved for 10 days at 0° C. 3.2 g of polyethylene are obtained. The data are indicated in Table 1.

Example 12

Polymerization of ethylene 1.5 ml of the catalytic composition prepared according to the previous example 8 (Zr=0.0015 mmoles), and 0.45 ml of a solution (0.995 M in toluene) of TIBAL, are charged into a 250 ml glass reactor, equipped with a magnetic stirrer and thermostat-regulated at 25° C. The reactor is pressurized at 0.5 bars with ethylene and the mixture is kept under stirring for 60 minutes, with the continuous feeding of ethylene to keep the pressure constantly at the initial value. At the end, the reactor is depressurized and 5 ml of methanol are introduced to terminate the polymerization and deactivate the catalyst. The polymer is recovered by precipitation in 400 ml of methanol acidified with hydrochloric acid, filtration and drying under vacuum at 40° C. for about 8 hours. 3.5 g of polyethylene are obtained. The data are summarized in Table 1.

Examples 13–16 (Comparative)

Polymerization of ethylene

For comparative purposes, four polymerization tests, not conformant with the present invention, are effected. Each polymerization test is carried out under the same conditions used in the previous example 9, with the difference that the catalytic composition is prepared according to the previous example 7, but using the various compositions prepared according to the comparative examples 1 to 4, respectively, instead of the activating composition of example 5. In all cases, no polymer is obtained.

Examples 17 and 18 (Comparative)

Polymerization of ethylene

Toluene (140 ml) and TIBAL (0.003 mol/l, acting as scavenger) are charged, under a stream of nitrogen, into a 250 ml glass reactor. The whole mixture is thermostat-regulated at the desired temperature and, at this stage, 10 ml of a toluene solution containing $1.50 \cdot 10^{-3}$ mmoles of the complex $Et(Ind)_2ZrCl_2$ and the cocatalyst consisting of $B(C_6F_5)_4CPh_3$ or methylaluminoxane (MAO) respectively, as indicated in Table 1, are charged, under a stream of nitrogen. After introducing the catalytic system, the reactor is pressurized with 0.5 bars of ethylene, the feeding being kept constant for the whole duration of the test. At the end, the reactor is depressurized and the polymerization is blocked with methanol. The polymer is recovered by precipitation in methanol acidified with hydrochloric acid (400 ml), filtration and drying under vacuum at 40° C. for about 8 hours. The data are indicated in Table 1.

TABLE 1

Ethylene polymerization tests

| Example | Activating comp. (i) (ref. ex.) | Al/Zr (mol./mol.) | T (° C.) | Time (min) | Yield (gram of polymer) | Activity (kg/g · h) |
|---|---|---|---|---|---|---|
| 9 | Ex. nr. 7 | 300 | 25 | 60 | 3.4 | 25 |
| 10 | Ex. nr. 7 | 300 | 25 | 60 | 3.7 | 25 |
| 11 | Ex. nr. 7 | 300 | 25 | 60 | 3.2 | 23 |
| 12 | Ex. nr. 8 | 300 | 25 | 60 | 3.5 | 25 |
| 17 comp. | $B(C_6F_5)_4CPh_3$ | 300 | 25 | 30 | 1.9 | 27.7 |
| 18 comp. | MAO | 500 | 50 | 30 | 2.1 | 30.6 |

Conditions:
Solvent = Toluene;
Complex(ii) = $Et(Ind)_2ZrCl_2$ [Zr] = $1 * 10^{-5}$ M;
$P_{ethylene}$ = 52 KPa

The invention claimed is:

1. An organometallic composition which can be used as activating component in a metallocene catalyst for the (co)polymerization of α-olefins, comprising the following three components in contact with one another:
(A) a fluorinated organic compound, comprising at least one di-unsaturated cycle with 5 or 6 carbon atoms, having the following formula (I):

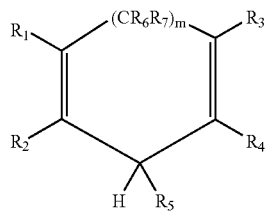

wherein: H is a weakly acid hydrogen atom,
each $R_i$ group (with i an integer from 1 to 7) is a substituent of the di-unsaturated cycle independently selected from hydrogen, fluorine or an aliphatic or aromatic, fluorinated or non-fluorinated hydrocarbyl group, having from 1 to 20 carbon atoms, optionally joined to a different $R_i$ hydrocarbyl group to form a further cycle,
on the condition that at least two of the groups $R_1$, $R_2$, $R_3$, $R_4$ or $R_5$ are independently selected from the group consisting of:
fluorine;
a fluorinated alkyl group having the formula —CF($R_9R_{10}$) wherein each $R_9$ or $R_{10}$ group can have any of the above meanings of the $R_i$ groups and at least one of them is fluorine, an alkyl fluorinated at least in position 1, a fluorinated aryl $Ar_F$ as defined below, or a fluorinated vinyl group $V_F$ as defined below;
a fluorinated aryl group $Ar_F$ substituted on the aromatic ring with at least two of fluorine, a —CF($R_9R_{10}$) group as defined above or a different $Ar_F$ group; and
a fluorinated vinyl group $V_F$ substituted on at least two positions of the double bond with at least one of a fluorine, a —CF($R_9R_{10}$) group or an $Ar_F$ group as defined above; and
"m" can have the values of 0 or 1;
(B) an organometallic compound sufficiently basic to react with the acid hydrogen of the above compound having formula (I) in an acid/base reaction;
(C) a polar aprotic organic compound, not containing metallic atoms, having a dielectric constant, in the pure state, equal to or greater than 2, and a weak coordinating capacity corresponding to a donicity DN not greater than 15 kcal/moles.

2. The organometallic composition according to claim 1, wherein, in said fluorinated compound (A) having formula (I), "m" is equal to 0.

3. The organometallic composition according to claim 1, wherein said organometallic compound (B) is a compound having the following formula (II):

$$M'R_nX_{(p-n)} \qquad (II)$$

wherein:
each R is independently a hydride, a hydrocarbon group having from 1 to 20 carbon atoms, or an alkyl- or aryl-amide group having from 1 to 20 carbon atoms;
each X is a halogen atom;
M' is a metal of group 1,2 or 13 of the periodic table of the elements;
"p" is the valence of M',
"n" is a decimal number ranging from 1 to p.

4. The organometallic composition according to claim 1, wherein said M' in formula (II) is Mg or Li, R is alkyl having from 1 to 10 carbon atoms and X is chlorine or bromine.

5. The organometallic composition according to claim 1, wherein said organometallic compound (B) is a compound having the formula $R^8 M^*$ wherein $M^*$ is an alkaline metal and $R^8$ is a monovalent hydrocarbon group, aliphatic or aromatic, having from 1 to 8 carbon atoms.

6. The organometallic composition according to claim 1, wherein $R_5$ in formula (I) is at least one selected from the group consisting of fluorine, trifluoromethyl and fluorinated aryl.

7. The organometallic composition according to claim 1, wherein said fluorinated di-unsaturated compound (A) has the following formula (IV)

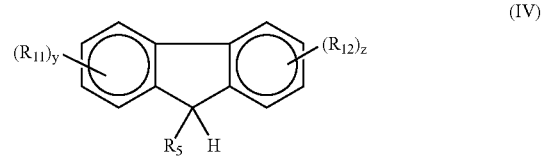

wherein:

$R_5$ has the same meaning defined for formula (I); "y" and "z" are independently integer values ranging from 1 to 4, extremes included;

the groups $R_{11}$ and $R_{12}$ are independently substituents of hydrogen atoms of the respective aromatic ring in one or more of the four positions available, and are at least one selected from the group consisting of fluorine and an aliphatic or aromatic, fluorinated or non-fluorinated hydrocarbyl group having from 1 to 20 carbon atoms, optionally joined to a different $R_{11}$ or $R_{12}$ hydrocarbyl group, respectively, to form an additional cycle;

on the condition that at least 3 of the groups $R_5$, $R_{11}$ and $R_{12}$, are independently selected from the group consisting of:

fluorine;

a fluorinated alkyl group having the formula —CF($R_9R_{10}$) wherein each $R_9$ or $R_{10}$ group can have any of the above meanings of the $R_1$ groups and at least one of these is fluorine, an alkyl fluorinated at least in position 1, a fluorinated aryl $Ar_F$ as defined below, or a fluorinated vinyl group $V_F$ as defined below;

a fluorinated aryl group $Ar_F$ substituted on the aromatic ring with at least two of fluorine, a —CF($R_9R_{10}$) group as defined above, or a different $Ar_F$ group; and a fluorinated vinyl group $V_F$ substituted on at least two positions of the double bond with at least one of a fluorine, a —CF($R_9R_{10}$) group, or an $Ar_F$ group as defined above.

8. The organometallic composition according to claim 7, wherein, in formula (IV), all eight $R_{11}$ and $R_{12}$ are the same and are trifluoromethyl, or fluorine.

9. The organometallic composition according to claim 1, wherein said polar aprotic compound (C) has a dielectric constant ranging from 3.0 to 20.0 and a DN donicity is from 0.5 to 8.0 kcal/mole.

10. The organometallic composition according to claim 1, wherein said polar aprotic compound (C) is at least one organic compound having from 1 to 30 carbon atoms comprising at least one atom selected from O, N, P and S, bonded to at least one fluorinated carbon atom or bonded to a fluorinated aromatic ring, or mixtures of these compounds.

11. The organometallic composition according to claim 1, wherein said polar aprotic compound (C) is at least one of a polyfluorinated ether and a polyfluorinated pyridine.

12. The organometallic composition according to claim 1, wherein components (A) and (B) are present in such a quantity that the ratio between M' in the organometallic compound having formula (II) and said di-unsaturated cyclic compound having formula (I) ranges from 1 to 100, and the ratio between the moles of (C) and the moles of (B) is from 5 to 5,000.

13. The organometallic composition according to claim 1, wherein the molar ratios (B)/(A) range from 1.0 to 10, and the molar ratio (C)/(B) is from 10 to 500.

14. A catalytic composition active in the (co)polymerization of α-olefins comprising the following components in contact with each other:

i) an organometallic composition comprising the following three components in contact with one another:

(A) a fluorinated organic compound, comprising at least one di-unsaturated cycle with 5 or 6 carbon atoms, having the following formula (I):

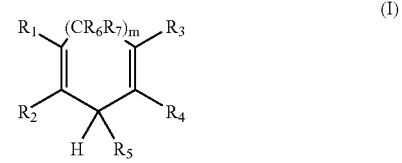

wherein: H is a weakly acid hydrogen atom, each $R_i$ group (with i an integer from 1 to 7) is a substituent of the di-unsaturated cycle independently selected from hydrogen, fluorine or an aliphatic or aromatic, fluorinated or non-fluorinated hydrocarbyl group, having from 1 to 20 carbon atoms, optionally joined to a different $R_i$, hydrocarbyl group to form a further cycle, on the condition that at least two of the groups $R_1$, $R_2$, $R_3$, $R_4$ or $R_5$ are independently selected from the group consisting of fluorine; a fluorinated alkyl group having the formula —CF($R_9R_{10}$) wherein each $R_9$ or $R_{10}$ group can have any of the above meanings of the $R_i$ groups and at least one of them is fluorine, an alkyl fluorinated at least in position 1, a fluorinated aryl $Ar_F$ as defined below, or a fluorinated vinyl group $V_F$ as defined below; a fluorinated aryl group $Ar_F$ substituted on the aromatic ring with at least two of fluorine, a —CF($R_9R_{10}$) group as defined above or a different $Ar_F$ group; and a fluorinated vinyl group $V_F$ substituted on at least two positions of the double bond with at least one of a fluorine, a —CF($R_9R_{10}$) group or an $Ar_F$ group as defined above; and "m" can have the values of 0 or 1;

(B) an organometallic compound sufficiently basic to react with the acid hydrogen of the above compound having formula (I) in an acid/base reaction;

(C) a polar aprotic organic compound, not containing metallic atoms, having a dielectric constant, in the pure state, equal to or greater than 2, and a weak coordinating capacity corresponding to a donicity DN not greater than 15 kcal/moles; and ii) a metallocene complex of a metal M of groups 3 to 6 of the periodic table, comprising at least one cyclopentadienyl anion, optionally substituted, penta-hapto ($\eta^5$-)-coordinated to said metal.

15. The catalytic composition according to claim 14, wherein said metallocene complex has the following formula (III):

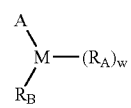

wherein:

M represents a transition metal belonging to groups 3 to 6 of the periodic table; each $R_A$ independently represents a group of an anionic nature bonded to the metal M, different from cyclopentadienyl or cyclopentadienyl substituted;

"w" is an index which has whole values 1, 2 or 3 depending on whether the valence of M is 3, 4 or 5 respectively;

the symbol "A" represents an anionic ligand having from 5 to 30 carbon atoms, comprising an cyclopentadienyl ring coordinated to the metal M, $R_B$ can have, regardless of the nature of the other substituents, any of the meanings defined above for the ligand A and for the group $R_A$, and can also be connected to said group A by means of a divalent organic group having from 1 to 15 carbon atoms, to form a so-called "bridged" metallocene complex.

16. The catalytic composition according to claim 15, wherein said metal M is at least one selected from the group consisting of Ti, Zr and Hf, and "w" is equal to 2.

17. The catalytic composition according to claim 15, wherein, in said metallocene complex having formula (III), group A is at least one selected from the group consisting of cyclopentadienyl, indenyl, fluorenyl, and their homologous products, wherein one or more carbon atoms of the molecular skeleton are substituted with a linear or branched alkyl, aryl or allkylsilyl radical having from 1 to 10 carbon atoms.

18. The catalytic composition according to claim 15, wherein, in said metallocene complex having formula (III), the group RB is an anionic ligand represented by A.

19. The catalytic composition according to claim 14, wherein said components (i) and (ii) are in such a quantity that the molar ratio [A]/[M], wherein [M] are the moles of metal of said metallocene complex of the metal M and [A] the moles of di-unsaturated compound having formula (I) in the organometallic composition (i), is from 0.5 to 50.

20. The catalytic composition according to claim 15, wherein said metallocene complex having formula (III), all the $R_A$ groups are different from hydrocarbyl or halogenated hydrocarbyl, and the solution further comprises a component (iii) consisting of a hydrocarbyl organometallic compound of an organometallic compound having formula (II)

$$M'R_nX_{(p-n)} \qquad (II)$$

wherein:
each R is independently a hydride, a hydrocarbon group having from 1 to 20 carbon atoms, or an alkyl- or aryl-amide group having from 1 to 20 carbon atoms;
each X is a halogen atom;
M' is a metal of group 1, 2 or 13 of the periodic table of the elements;
"p" is the valence of M',
"n" is a decimal number ranging from 1 to p.

21. The catalytic composition according to claim 20, wherein said hydrocarbyl organometallic compound (iii) is an aluminum alkyl with an atomic ratio Al/M ranging from 10 to 1000.

22. The catalytic composition according to claim 20, wherein said hydrocarbyl organometallic compound (iii) is included in component (B) of said organometallic composition.

23. A method for the preparation of a catalytic composition comprising:
preparing the organometallic composition of claim 1, and mixing the organometallic composition with a metallocene complex of a metal M of groups 3 to 6 of the periodic table, comprising at least one cyclopentadienyl anion, optionally substituted, penta-hapto($\eta^5$-)-coordinated to said metal to react the organometallic composition and the metallocene,
wherein the ratio [A]/[M], wherein [M] are the moles of metallocene complex having formula (III) and [A] the moles of fluorinated compound having formula (I), is from 0.5 to 50.

24. The method according to the claim 23, wherein the organometallic composition and the metallocene are mixed and reacted with each other in an inert diluent and at temperatures of from room temperature to 150° C., for times of from 1 to 30 minutes.

25. The method according to claim 23, wherein said metallocene complex (ii) is a complex having formula (III) wherein $R_A$ is different from hydrocarbyl or halogenated hydrocarbyl, further comprising:
reacting said metallocene complex with a quantity of said organometallic compound having formula (II) sufficient for effecting the alkylation of said metallocene complex $$M'R_nX_{(p-n)} \qquad (II)$$

wherein:
each R is independently a hydride, a hydrocarbyl group having from 1 to 20 carbon atoms, or an alkyl- or aryl-amide group having from 1 to 20 carbon atoms;
each X is a halogen atom.
M' is a metal of group 1, 2 or 13 of the periodic table of the elements;
"p" is the valence of M',
"n" is a decimal number ranging from 1 to p.

26. The method according to claim 25, wherein said organometallic: compound having formula (II) is an aluminum alkyl, and the atomic ratio Al/M is from 5 to 1000.

27. A process for the (co)polymerization of one or more α-olefins, both in continuous or batchwise, in one or more steps in suitable reactors, at low (0.1–1.0 MPa), medium (1.0–10 MPa) or high (10–150 MPa) pressure, at temperatures of from 20° to 240° C., optionally in the presence of an inert diluent, wherein said one or more α-olefins are (co)polymerized, under one of the above conditions, in the presence of a catalytic composition according to claim 14.

28. The process according to claim 27, wherein ethylene is copolymerized with at least one α-olefin having from 3 to 10 carbon atoms.

29. The process according to claim 28, wherein, in addition to said at least one α-olefin, a non-conjugated diene, aliphatic or alicyclic, having from 5 to 20 carbon atoms, is copolymerized with ethylene.

30. The process according to claim 27, wherein it is carried out in solution or suspension in a suitable inert liquid medium consisting of an aliphatic or cycloaliphatic hydrocarbon having from 3 to 15 carbon atoms, or a mixture thereof.

31. The process according to claim 27, wherein said catalytic composition is prepared separately and subsequently put in contact with said one or more α-olefins.

32. The process according to claim 27, wherein said catalytic composition is prepared by putting the fluorinated organic compound having formula (I), the organometallic compound having formula (II) and the metallocene complex having formula (III) respectively, in contact, in suitable proportions, directly in the polymerization environment.

33. The organometallic composition of claim 1, which consists essentially of components (A), (B), and (C).

34. The organometallic composition of claim 1, which consists of components (A), (B), (C) and a hydrocarbon solvent.

35. The organometallic composition of claim 1, wherein the donicity DN is defined by:

$$DN_C = -\Delta H_{C.SbCl5}$$

wherein $\Delta H_{C.SbCl5}$ is the molar enthalpy in kcal measured by the interaction of component C with $SbCl_5$ in a dilute solution of dichloroethane.

* * * * *